No. 896,906. PATENTED AUG. 25, 1908.
M. GARANGER.
LOOP-THE-GAP APPARATUS.
APPLICATION FILED APR. 28, 1908.
4 SHEETS—SHEET 2.
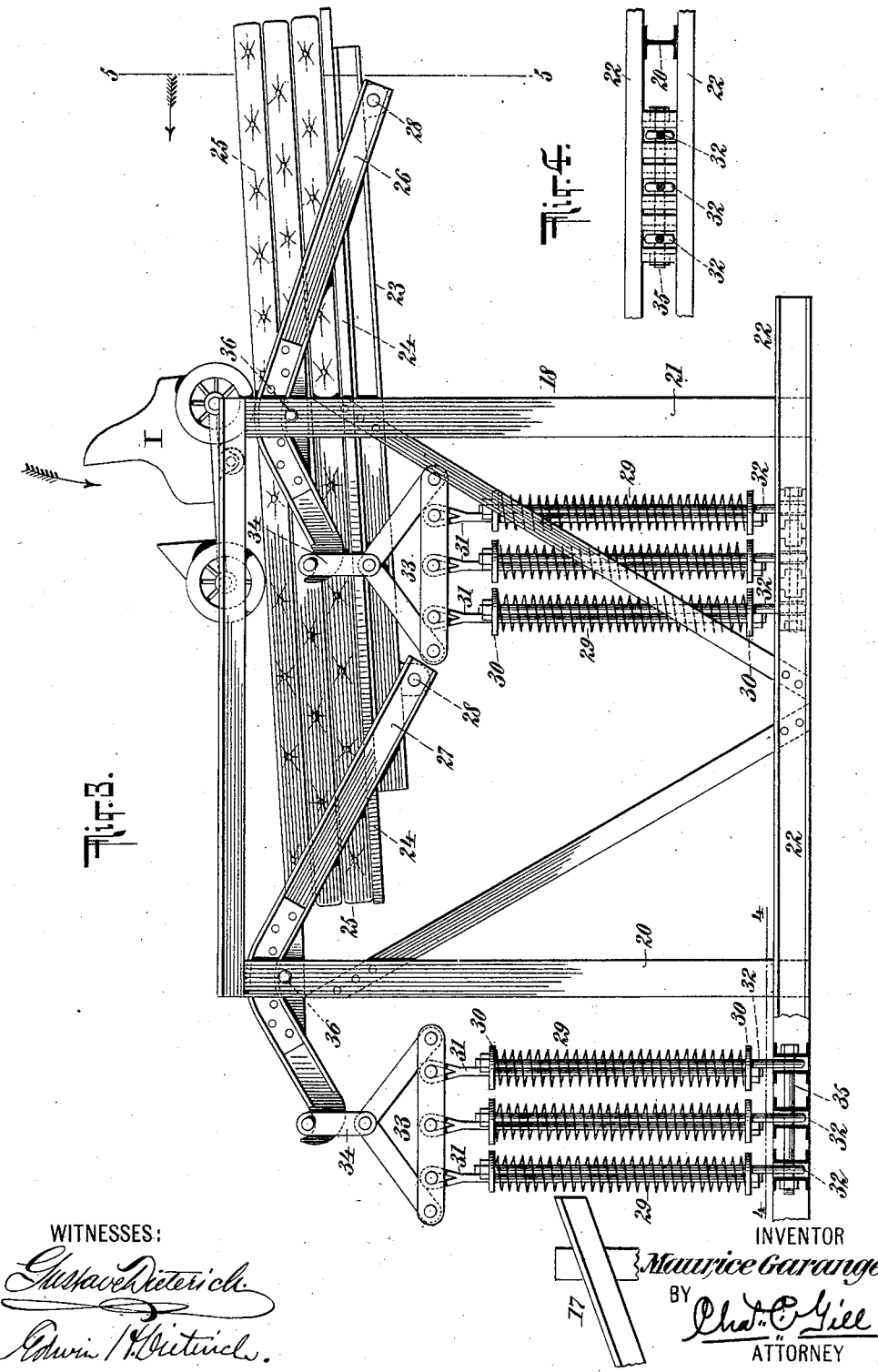
WITNESSES:
Gustave Dieterich
Edwin F. Dietrich
INVENTOR
Maurice Garanger
BY
Chas. C. Gill
ATTORNEY No. 896,906.  
PATENTED AUG. 25, 1908.  
M. GARANGER.  
LOOP-THE-GAP APPARATUS.  
APPLICATION FILED APR. 28, 1908.  
4 SHEETS—SHEET 3.
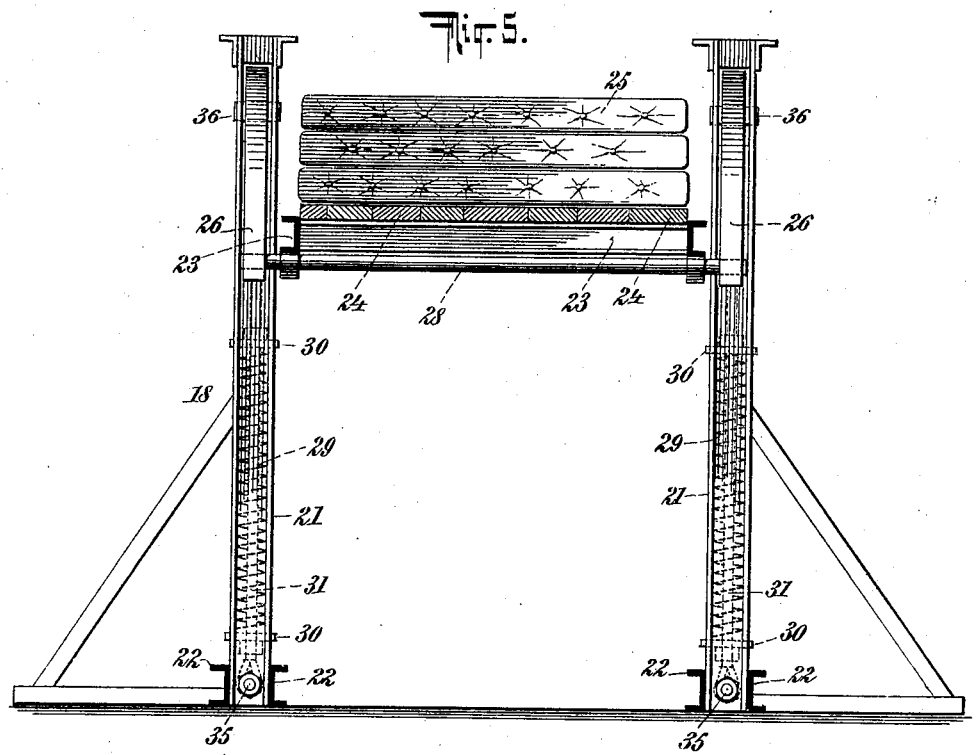
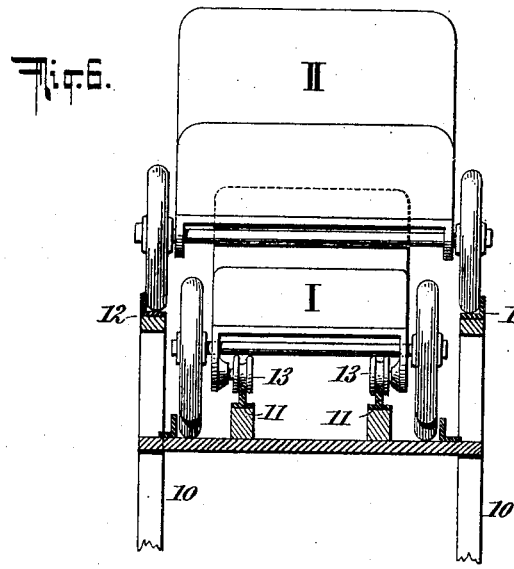
WITNESSES:  
INVENTOR  
Maurice Garanger  
BY  
ATTORNEY

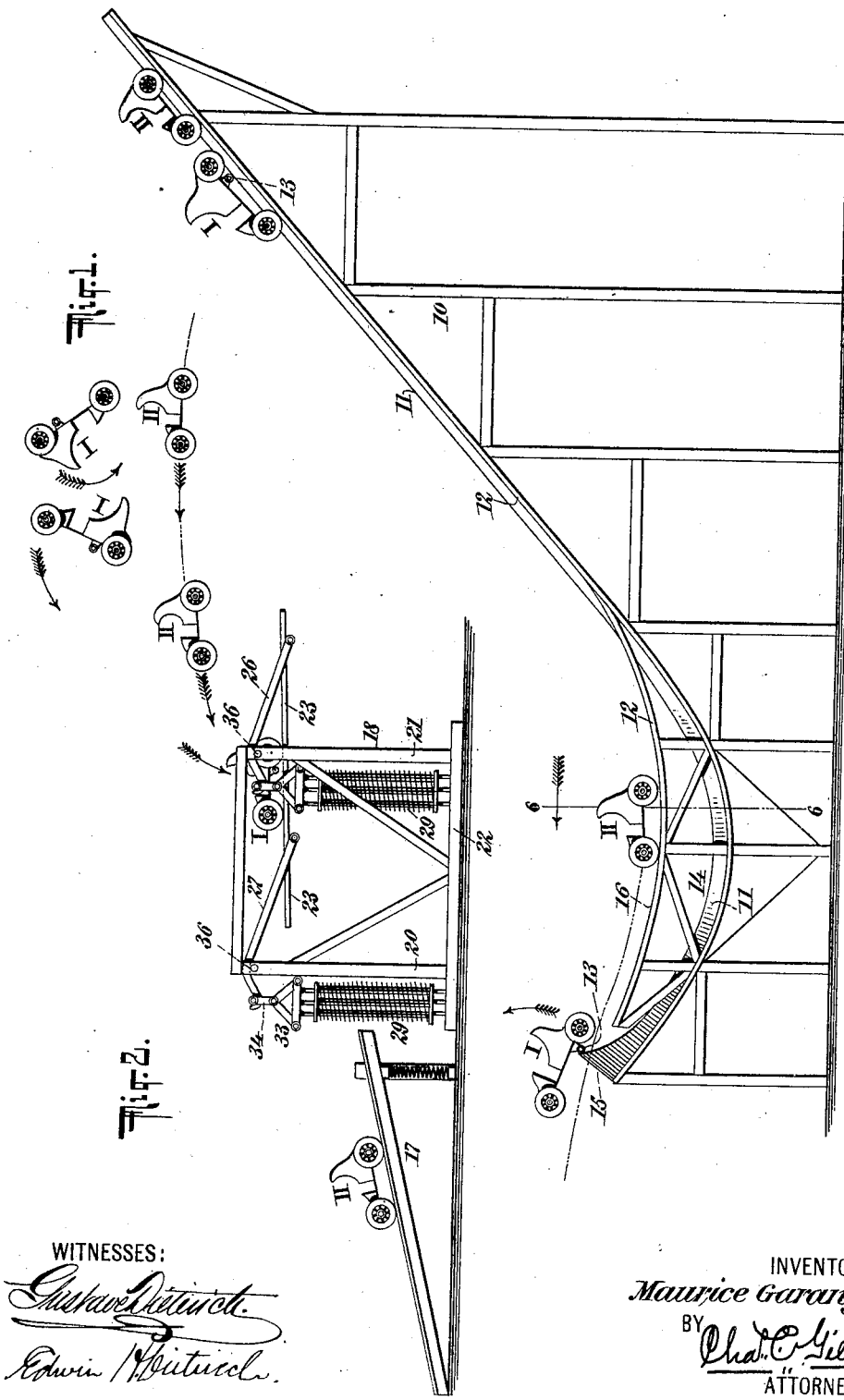

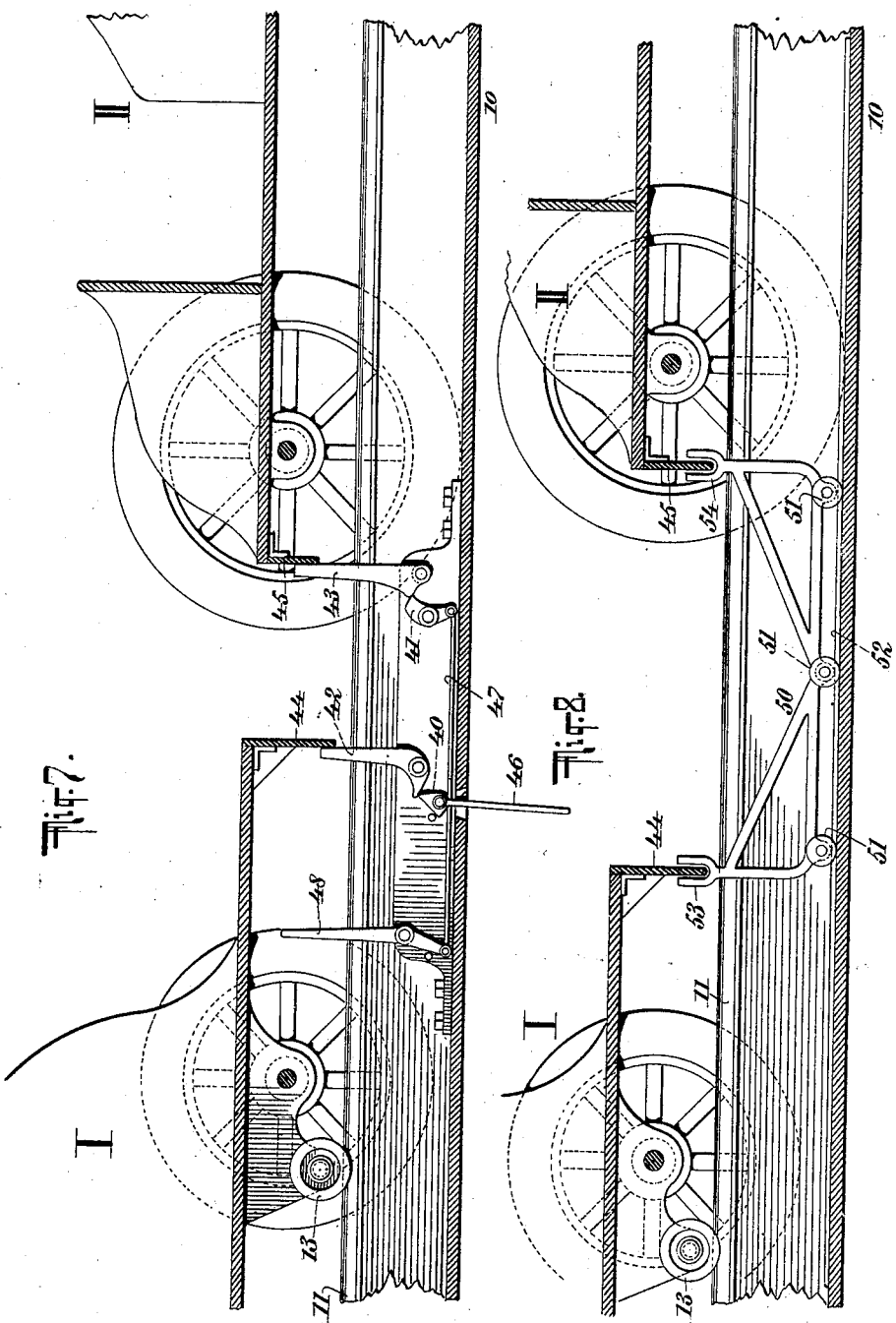

UNITED STATES PATENT OFFICE.

MAURICE GARANGER, OF NEW YORK, N. Y.

LOOP-THE-GAP APPARATUS.

No. 896,906.　　　Specification of Letters Patent.　　Patented Aug. 25, 1908.

Application filed April 28, 1908. Serial No. 429,621.

*To all whom it may concern:*

Be it known that I, MAURICE GARANGER, a citizen of France, and a resident of New York city, in the county of New York and State of New York, have invented certain new and useful Improvements in Loop-the-Gap Apparatus, of which the following is a specification.

The invention relates to improvements in "loop-the-gap" apparatus; and it consists in the novel features, arrangements, and combinations of parts hereinafter described, and particularly pointed out in the claims.

The invention comprises certain improvements on the loop-the-gap apparatus shown and described in Letters Patent No. 826,560 granted to me on July 24, 1906. In the use of the apparatus described in said patent a vehicle is caused to run down an inclined track with great velocity and is subsequently caused to perform one or more complete revolutions lengthwise, crossing a gap in the track, and finally running safely down a second section of the track separate from the first. In the use of my present invention two vehicles, one properly spaced behind the other, are caused to run down an inclined track and one of said vehicles, when crossing the gap in the track, is caused to make one or more complete revolutions lengthwise, while at the same time the second vehicle crosses the gap on a jump, passing below the vehicle which is making the revolution or revolutions, and finally runs safely down a section of the track, while the vehicle which made the revolution or revolutions lands upon a cushioned platform and there remains, this cushioned platform being intermediate the main portion of the track and the final portion thereof and the gap being between the cushioned platform and the main portion of the track.

My invention comprises, therefore, a main track frame down which the vehicles, one spaced behind the other, will travel, rails provided on said frame for causing the foremost vehicle, while jumping the gap, to make one or more revolutions or turn somersaults, rails also provided on said frame for causing the rear vehicle to jump the gap without turning a somersault, a cushioned frame beyond the gap for receiving and holding the foremost vehicle after it has performed its revolutions, and an inclined frame beyond the cushioned platform upon which the second vehicle will finish its jump and down which it will safely run to the ground.

My invention also comprises means for properly spacing the vehicles on the main track so that no accident may occur during the leap thereof from the lower end of said track.

The invention will be fully understood from the detailed description hereinafter presented, reference being had to the accompanying drawings, in which:

Figure 1 is a side elevation of the main track frame, illustrating the two vehicles indicated by "I" and "II", respectively, at the upper end of said frame and at the lower end thereof, the vehicle numbered I being about to loop-the-gap and make a revolution while so doing and the vehicle numbered II shown as following vehicle number I on the rails which will cause it to simply jump the gap without turning the somersault; Fig. 2 is a side elevation of the platform on which vehicle I lands and of the inclined platform on which vehicle II lands and descends; Fig. 2 also represents the vehicles in the relative positions they take while crossing the gap, and Fig. 2 should be considered as a continuation of Fig. 1, the gap being between the cushioned frame which takes vehicle number I and the lower upwardly curved end of the main frame shown in Fig. 1; Fig. 3 is an enlarged side elevation, partly broken away, of the cushioned frame which receives the vehicle after it has crossed the gap; Fig. 4 is a horizontal section through a portion of the same on the dotted line 4—4 of Fig. 3; Fig. 5 is a vertical section through the same on the dotted line 5—5 of Fig. 3; Fig. 6 is a vertical transverse section through the main track frame, and illustrates the two vehicles, one behind the other, on the rails of said frame, the section being on the dotted line 6—6 of Fig. 1; Fig. 7 is a longitudinal section through adjacent portions of the vehicles and main track frame, and illustrates mechanism by which the front vehicle number I may, at the opportune moment, release vehicle number II to descend; and Fig. 8 is a like section showing a modified means for controlling the relation of the automobiles or vehicles to each other during their descent.

In the drawings, 10 designates the main track-frame or platform having inclined track-rails 11, 12, the rails 11 being for the wheels 13 of the vehicle numbered I and the rails 12 being for the wheels of the vehicle numbered II and being set outside of the rails 11, as shown in Fig. 6. The rails 11, wheels 13 and vehicle I correspond exactly with features shown in my aforesaid Patent 826,560. The rails 11 at the lower end of the frame 10 curve downwardly on a deep curve, as at 14, and are formed with upwardly extending sections 15 which, together with the momentum of the vehicle and the curved portion 14 of the track rails 11, coöperate with the wheels 13 in causing the vehicle I to turn a somersault, as indicated at the left hand part of Fig. 2, after it leaves the track-frame 10, this operation being shown and described in my aforesaid Letters Patent dated July 24, 1906.

The track-rails 12 are intended solely for the wheels of the vehicle II and, as shown in Fig. 1, the lower ends of these rails have a shallow curvature, as at 16, which curvature is just sufficient, coupled with the momentum attained by the vehicle, to cause the latter to leap across the gap without turning a somersault. The track-rails 11, 12 have been designed for enabling both vehicles to travel down the frame 10, one behind the other, at the same time and both vehicles to cross the gap at the same time, the track-rails 11 causing the first vehicle to turn a somersault during its leap and the second vehicle to jump across the gap below the revolving first vehicle, as shown at the right hand portion of Fig. 2, the second vehicle, by reason of making a plain leap passes in advance of the first vehicle while the latter is making its revolutions. The curvatures 14, 16 in the track-rails 11, 12 are, therefore, of importance in their coöperative action upon the vehicles, since by reason thereof they permit both vehicles to be safely crossing the gap at the same time, said vehicles being in the same vertical plane and the rear vehicle gaining time on and passing in advance of the first vehicle so as not to interfere with the landing of the latter.

In advance of the lower end of the frame 10 and forming a continuation of the general frame structure, I provide an inclined frame 17 and cushioned frame 18, the frames 17, 18 being auxiliary to the frame 10, and the frame 17 being adapted to receive the vehicle numbered II after it has made its leap and permit the same to ride downwardly thereon to the ground, while the frame 18 is intended to receive and retain the vehicle numbered I, as represented in Fig. 2. The frame 17 corresponds substantially with the auxiliary inclined frame shown in Figs. 1, 2 and 6 of my aforesaid Letters Patent, and it is a spring frame down which the vehicle landing upon it, will ride. The frame 18 comprises vertical I-beam standards 20, 21, at each side thereof, said standards being suitably braced at each side of the frame and secured at their lower ends between the channel-bars 22. Between the upper portions of the standards 21 is located a durable platform 23 consisting preferably of rolled beam side-bars connected together and sustaining a floor 24 upon which will preferably be placed a mattress or mattresses 25. The platform 23 is suspended from the rear ends of corresponding side levers 26, 27 (Fig. 3), the said levers being in the form of bent beams respectively connected in pairs at their rear ends by transverse rods 28 passing through ears on the end portions of the platform 23, while the front ends of said levers 26 incline downwardly and are of hook-shape, at each side of the platform 18, and have a downward tension exerted against them by the series of springs 29, the latter being vertically disposed between heads 30, 30 and encompassing rods 31, 32. The rods 31 for each lever are secured to a frame 33 which by means of a link 34 is hooked upon the forward end of the lever. The rods 32 for each lever are secured by a horizontal bolt 35 to the lower side frame of the auxiliary platform 18. The springs 29 are under compression and act to force the heads 30, 30 apart, thereby causing the rods 31 to exert a downward pull upon the frames 33 and levers 26, 27, whereby the platform 23 is yieldingly held in its normal upward position. The levers 26, 27 are pivotally supported on transverse pins 36 and correspond with each other.

It is intended that the forward vehicle "I" after making its leap across the gap shall land upon the platform 23 and be there held, and it is desirable that the vehicle land on the said platform without shock, by reason of which I cushion the platform by means of the springs 29 and also by means of the mattresses 25, the latter in addition to serving as a cushion, acting to hold the vehicle I against traveling movement. When the vehicle I lands upon the mattresses 25, the platform 23 will be pressed downwardly thereby, and depress the rear ends of the levers 26, 27. The depression of the rear ends of the levers 26, 27 results in the forward ends of said levers being turned upwardly and exerting a pull on the rods 31 against the expansive force of the springs 29, thereby further compressing the latter and enabling said springs to cushion the platform 23. When the mattresses 25 are employed and the vehicle lands upon them, they afford a soft cushion into which the wheels of the vehicle will sink and which will operate to prevent forward motion of the vehicle, the softness of the mattresses serving to chock the wheels of the vehicle and retain the latter in substantially the location in which it lands.

My invention embraces the main track frame 10 having two sets of track-rails, two vehicles on said frame and adapted to said rails, and auxiliary platforms 17, 18 separated by a space from the lower end of the frame 10, said space constituting the gap, and one of said auxiliary platforms being adapted to receive one of the vehicles and the other vehicle after said vehicles have crossed the gap, said track-rails at the lower forward end of the main track frame having different curvatures, one to compel one vehicle to turn a somersault while making its leap, and the other to cause the other vehicle to jump the gap without turning a somersault and without colliding with the vehicle first leaving the rails, the intention being that both vehicles shall be in motion crossing the gap at the same time.

It is of importance that the vehicles be properly timed in their descent on the main track-rails, since otherwise accidents might occur at the gap. I illustrate in Figs. 7 and 8 two means for timing the vehicles so that they may safely pass down the track frame 10, one behind the other, and be seen crossing the gap at the same time. In Fig. 7 the means illustrated comprise two stops 40, 41 for holding both vehicles stationary, said stops being pivoted and respectively in engagement with levers 42, 43, which are pivoted and whose lower ends are adapted to engage with the stops 40, 41 and whose upper ends are respectively engaged by the portions or members 44, 45 of the respective vehicles. When the stops 40, 41 and levers 42, 43, are in the position and relation shown in Fig. 7, the pressure exerted by the vehicles against the upper ends of the levers 42, 43 keeps the lower ends of said levers pressed against the stops 40, 41. I connect the stop 40 with a rod 46 for manually turning or releasing the same from the lever 42, and I connect the stop 41 by means of a rod 47 with a pivoted lever 48 whose upper end stands in the path of the member 44 of vehicle numbered I. In starting the two vehicles shown in Fig. 7 I release the stop 40 by means of the rod 46 and thereby allow the vehicle I to start in motion and to free or release the stop 41 by the contact of the member 44 of said vehicle against the upper end of the lever 48, which being pushed forwardly by the descending vehicle "I" will drive the rod 47 rearwardly to turn the stop 41 from the lever 43, which will then cease to offer resistance to vehicle II and permit said vehicle to immediately descend. By locating the lever 48 a definite distance from the member 44 of vehicle "I" intended to operate it, I am enabled to definitely arrange the timing of the vehicles I, II in their starting to descend, so that only the proper interval shall elapse between the starting of the first vehicle and the starting of the second vehicle. It is of great importance that vehicles I, II in their relation to each other during their movement shall be accurately timed, otherwise an element of danger will ensue at the time the vehicles are crossing the gap. In Fig. 7 I rely upon the first vehicle started to start the second vehicle at the proper second, the interval between the startings of the respective vehicles being necessarily very brief.

In lieu of relying upon the first vehicle to start the second vehicle at the opportune moment, I may connect the two vehicles by a frame 50, shown in Fig. 8, having rollers 51 to ride upon a rail 52 on the main track-frame 10 and formed with upwardly extending bifurcated arms 53, 54 adapted to freely engage the lower portions of the members 44, 45 of vehicles I, II. The frame 50 is of definite length, and when it connects the vehicles I, II it will keep them separated by the proper space. The frame 50 when used will remain connected with the vehicles I, II until the latter reach the lower portion of the main track frame 10, at which place the vehicles will automatically release themselves from the frame 50 and the latter will simply remain at the lower end of the said frame 10 or may fall through an open space in the flooring of the same. When the arrangement illustrated in Fig. 8 is made use of, it will be seen that when the vehicle I starts down the deep curvature 14 of its track-rails it will, drawing the frame 50 with it, leave the vehicle II on the more elevated curvature 16 of its track-rails and that thereby the member 45 of the vehicle II will be released from the fork 54 of the frame 50, the said frame lowering downwardly from said member 45. When the vehicle "I" starts to make its leap or attains the position shown in Fig. 1, its member 44 will ride upwardly from the fork 53 of the frame 50, leaving the latter, both vehicles then being free of the frame 50. The object of timing the vehicles with relation to each other is to enable them to reach the lower portion of the frame 10 and make their leaps with safety, and it is necessary that the frame 50 shall lose its engagement with vehicle I when the latter is in position to make its leap. If desired, the flooring of the frame 10 between the track-rails 11 at the base of the curvature 14 may be left open or have an opening formed therein through which the frame 50 may pass when it reaches that point and thus become freed from the vehicle "I" before the latter reaches its position at the extreme lower end of the frame 10 preparatory to making the leap, or if preferred said frame 50 may on being released remain on the flooring in the deep curvature 14 between the rails 11.

I do not confine myself to the use of the special mechanisms shown for timing the vehicles, nor to the special constructions shown of the auxiliary platforms 17, 18, nor, in every instance, to one vehicle turning a somersault during its leap across the gap so long as the curvatures of the rails cause both vehicles to cross the gap on the same vertical plane at the same time.

What I claim as my invention and desire to secure by Letters Patent, is:

1. Two wheeled vehicles, a downwardly inclined track-platform therefor having two sets of rails curved upwardly at the lower end thereof, one set of said rails having a curvature deeper than the other and sufficient to cause the vehicle riding on them to turn a somersault on leaving them and the other set of said rails having a shallow curvature to cause the vehicle riding on them to make a leap outside of the path of the other vehicle, whereby the two vehicles may be crossing the gap at the same time, combined with auxiliary platforms spaced from said track-platform to receive said vehicles when they land; substantially as set forth.

2. Two wheeled vehicles, a downwardly inclined track-platform therefor having two sets of rails curved upwardly at the lower end thereof, one set of said rails having a curvature deeper than the other and sufficient to cause the vehicle riding on them to turn a somersault on leaving them and the other set of said rails having a shallow curvature to cause the vehicle riding on them to make a leap outside of the path of the other vehicle, whereby the two vehicles may be crossing the gap at the same time, combined with auxiliary platforms spaced from said track-platform to receive said vehicles when they land, one of said auxiliary platforms being inclined to permit the vehicle landing on it to ride down the same, and the other of said auxiliary platforms being cushioned and adapted to retain the vehicle landing on it; substantially as set forth.

3. Two wheeled vehicles, a downwardly inclined track-platform therefor having two sets of rails curved upwardly at the lower end thereof, one set of said rails having a curvature deeper than the other and sufficient to cause the vehicle riding on them to turn a somersault on leaving them and the other set of said rails having a shallow curvature to cause the vehicle riding on them to make a leap outside of the path of the other vehicle, whereby the two vehicles may be crossing the gap at the same time, combined with auxiliary platforms spaced from said track-platform to receive said vehicles when they land, and means for automatically controlling the timing of said vehicles on the track-platform, whereby both vehicles are enabled to safely cross the gap without colliding with each other; substantially as set forth.

4. Two wheeled vehicles, a downwardly inclined track-platform therefor having two sets of rails curved upwardly at the lower end thereof, one set of said rails having a curvature deeper than the other and sufficient to cause the vehicle riding on them to turn a somersault on leaving them and the other set of said rails having a shallow curvature to cause the vehicle riding on them to make a leap outside of the path of the other vehicle, whereby the two vehicles may be crossing the gap at the same time, combined with auxiliary platforms spaced from said track-platform to receive said vehicles when they land, and means for automatically controlling the timing of said vehicles on the track-platform, whereby both vehicles are enabled to safely cross the gap without colliding with each other, said means comprising spaced stops to hold both vehicles stationary, means for manually releasing the stop of the forward vehicle, and means to be actuated by the forward vehicle after it has traveled a definite distance for releasing the stop of the rear vehicle; substantially as set forth.

5. Two wheeled vehicles, a downwardly inclined track-platform therefor having two sets of rails curved upwardly at the lower end thereof, one set of said rails having a curvature deeper than the other and sufficient to cause the vehicle riding on them to turn a somersault on leaving them and the other set of said rails having a shallow curvature to cause the vehicle riding on them to make a leap outside of the path of the other vehicle, whereby the two vehicles may be crossing the gap at the same time, combined with auxiliary means spaced from said track-platform to receive said vehicles, when they land; substantially as set forth.

6. Two wheeled vehicles, a downwardly inclined track-platform therefor having two sets of rails curved upwardly at the lower end thereof, one set of said rails having a curvature deeper than the other and sufficient to cause the vehicle riding on them to turn a somersault on leaving them and the other set of said rails having a shallow curvature to cause the vehicle riding on them to make a leap outside of the path of the other vehicle, whereby the two vehicles may be crossing the gap at the same time, combined with auxiliary means spaced from said track-platform to receive said vehicles when they land, and means for automatically controlling the timing of said vehicles on the track-platform, whereby both vehicles are enabled to safely cross the gap without colliding with each other; substantially as set forth.

7. Two wheeled vehicles, a downwardly inclined track-platform therefor having two sets of rails curved upwardly at the lower end thereof, one set of said rails having a curvature deeper than the other and sufficient to cause the vehicle riding on them to turn a somersault on leaving them and the other set of said rails having a shallow curvature to cause the vehicle riding on them to make a leap outside of the path of the other vehicle, whereby the two vehicles may be crossing the gap at the same time, combined with auxiliary means spaced from said track-platform to receive said vehicles when they land, and means for automatically controlling the timing of said vehicles on the track-platform, whereby both vehicles are enabled to safely cross the gap without colliding with each other, said means comprising spaced stops to hold both vehicles stationary, means for manually releasing the stop of the forward vehicle, and means to be actuated by the forward vehicle after it has traveled a definite distance for releasing the stop of the rear vehicle; substantially as set forth.

8. The combination with a wheeled vehicle, of a downwardly-inclined rigid platform having track-rails curved upwardly at its lower end for said vehicle and for causing the same on leaving the rails to turn a somersault, and a spring-platform spaced apart from and in the same vertical plane with said rigid platform and adapted to receive and retain said vehicle after it has crossed the gap; substantially as set forth.

9. The combination with a wheeled vehicle, of a downwardly-inclined rigid platform having track-rails curved upwardly at its lower end for said vehicle and for causing the same on leaving the rails to turn a somersault, and a spring-platform spaced apart from and in the same vertical plane with said rigid platform and adapted to receive and retain said vehicle after it has crossed the gap, said spring platform comprising a vehicle-receiving frame, pairs of pivoted levers supporting said frame at both ends, and springs connected with said levers and exerting their force to hold said receiving-frame in and return it to its initial position; substantially as set forth.

10. Two wheeled vehicles, a downwardly inclined track-platform therefor having two sets of rails curved upwardly at the lower end thereof, said sets of rails presenting different curvatures for the respective vehicles riding on them for causing both vehicles to cross the gap at the same time, combined with auxiliary means spaced from said track-platform, to receive said vehicles when they land; substantially as set forth.

11. Two wheeled vehicles, a downwardly inclined track-platform therefor having two sets of rails curved upwardly at the lower end thereof, said sets of rails presenting different curvatures for the respective vehicles riding on them for causing both vehicles to cross the gap at the same time, combined with auxiliary means spaced from said track-platform, to receive said vehicles when they land, and means for automatically controlling the timing of said vehicles on the track-platform, whereby both vehicles are enabled to safely cross the gap without colliding with each other; substantially as set forth.

Signed at New York city, in the county of New York, and State of New York, this 25th day of April A. D. 1908.

MAURICE GARANGER.

Witnesses:
ARTHUR MARION,
CHAS. C. GILL.